Figure 1:
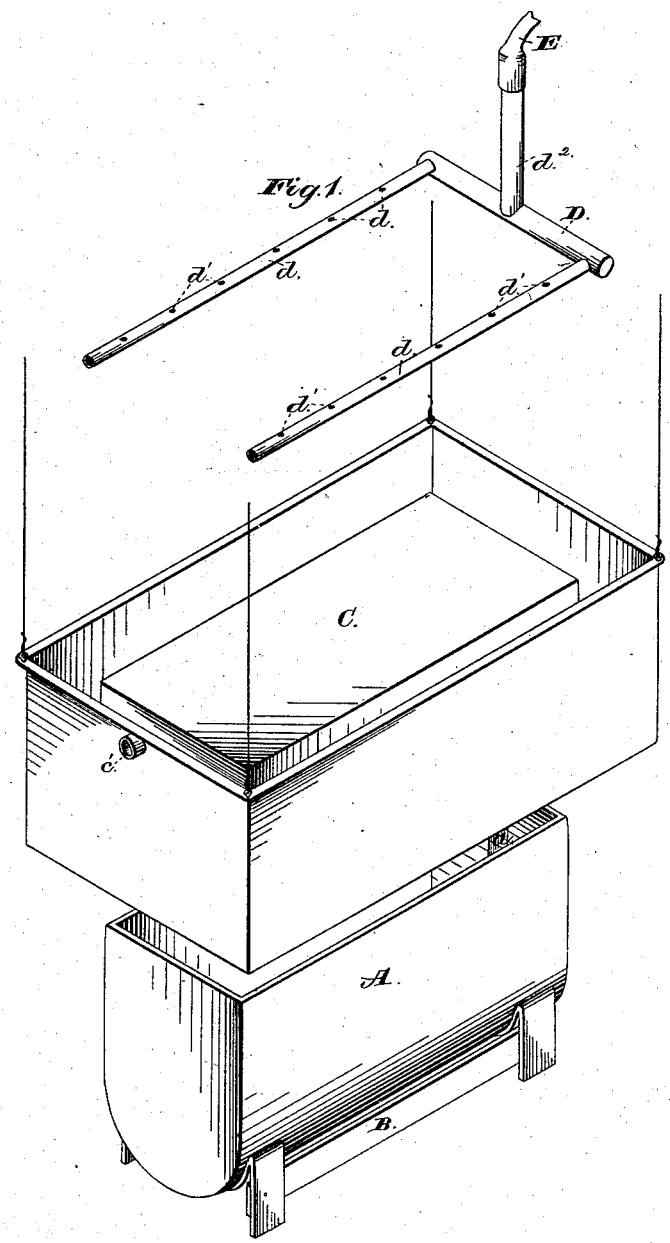

(Model.)

2 Sheets—Sheet 1.

D. BROWN.
MILK COOLER.

No. 261,665.  Patented July 25, 1882.

Witnesses
Jas. E. Hutchinson
Henry C. Hazard

Inventor
Daniel Brown, by
Geo. S. Prindle, his Atty

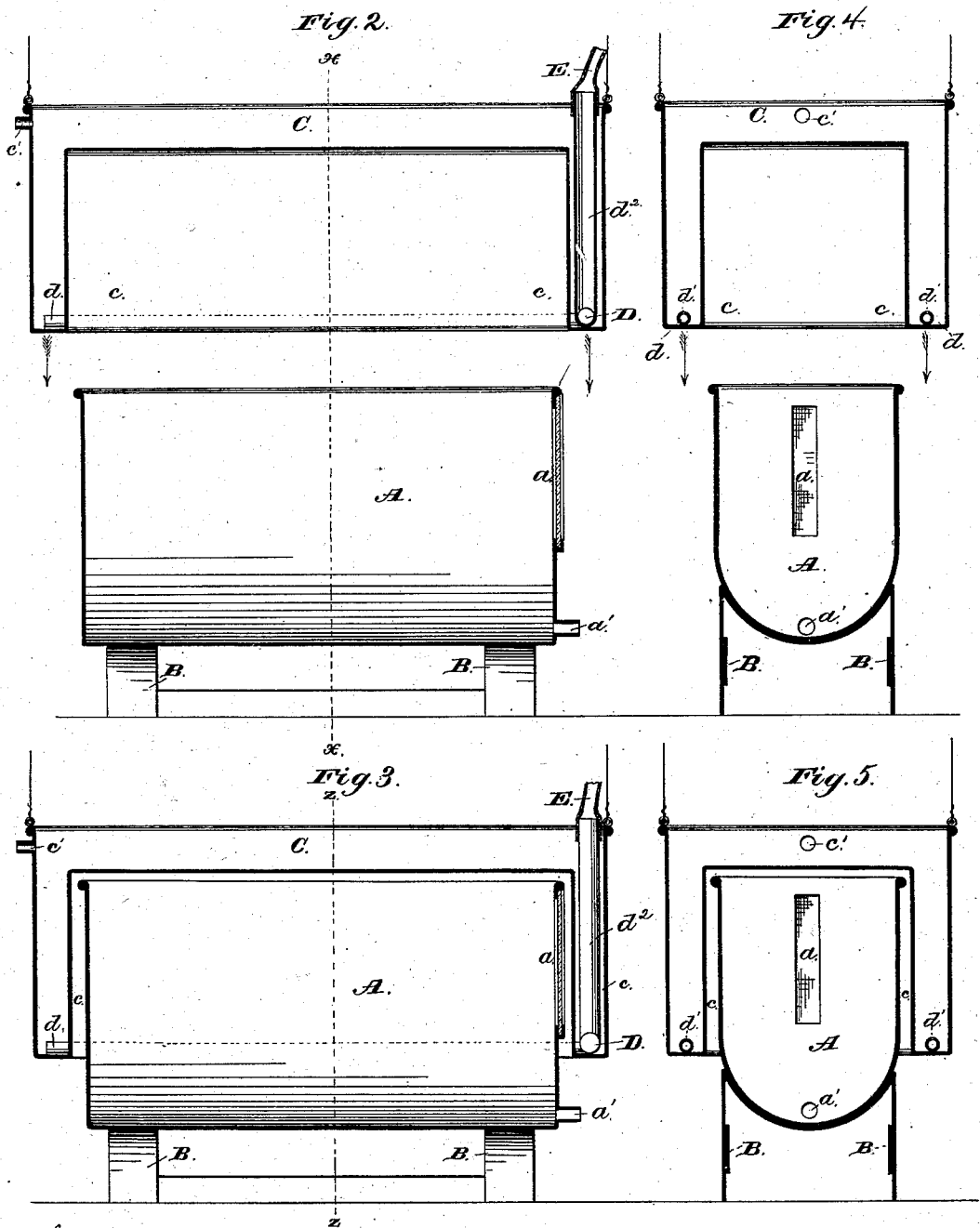

UNITED STATES PATENT OFFICE.

DANIEL BROWN, OF SOUTH OTSELIC, NEW YORK.

MILK-COOLER.

SPECIFICATION forming part of Letters Patent No. 261,665, dated July 25, 1882.

Application filed April 1, 1881. (Model.)

*To all whom it may concern:*

Be it known that I, DANIEL BROWN, of South Otselic, in the county of Chenango, and in the State of New York, have invented certain new and useful Improvements in Milk-Coolers; and I do hereby declare that the following is a full, clear, and exact description thereof, reference being had to the accompanying drawings, making a part of this specification, in which—

Figure 1 is a perspective view of the parts of my apparatus separated from each other. Figs. 2 and 3 are vertical sections of the same upon central longitudinal lines, and show respectively the relative positions occupied when the cooler is raised and when lowered and inclosing the milk-vat; and Figs. 4 and 5 are respectively transverse sections upon lines $x\ x$ and $z\ z$ of Figs. 2 and 3.

Letters of like name and kind refer like parts in each of the figures.

The design of my invention is to enable milk to be deprived of its cream in a thorough manner and with ease and dispatch; and to this end it consists in the combination, with a milk-vat, of a reservoir of corresponding shape horizontally to said vat, and adapted to contain a cooling medium and be suspended above said vat, so as to surround the same at its top and sides, out of contact therewith at its sides, whereby air is permitted to circulate freely around and over said vat, substantially as and for the purpose hereinafter specified.

It consists, further, in the combination, with a milk-vat, of a reservoir corresponding in horizontal shape to the shape of the vat, and having a central recess and a surrounding space to receive the cooling medium, and having a water supply and overflow, substantially as and for the purpose hereinafter described and claimed.

In the annexed drawings, A represents a milk-vat having preferably a rectangular form in plan view and a semi-cylindrical bottom. Said vat is supported upon a suitable base, B, and is provided at one end with a glazed opening, $a$, and at or near the bottom of said end has an opening, $a'$, through which its liquid contents may be drawn.

Directly above the vat A is suspended a reservoir, C, which corresponds in horizontal shape to the like feature of said vat, and within its lower side is provided with a recess, $c$, that has such size and shape as to enable said reservoir to be placed over said vat, as shown in Figs. 3 and 5, in which position said reservoir incloses the top and sides of said vat, a space being left between the top and side walls of the latter and the top and sides of said recess, such construction enabling air to circulate freely over and around said vat.

The reservoir C has such dimensions as to leave around the sides and above the recess $c$ a considerable space for the reception of water, and within the bottom of the same, at one end, is placed a pipe, D, that extends from side to side of said space, and at each end is provided with a pipe, $d$, that extends to or near the opposite end of said reservoir, and at suitable points has small openings $d'$ that preferably open upward.

From the longitudinal center of the pipe D a pipe, $d^2$, extends upward to or above the top of the reservoir C, and at its upper end has attached a flexible pipe or hose, E, that is connected with a water-supply.

An overflow-opening, $c'$, near the upper edge, at one end of said reservoir, completes the same, which is suspended by suitable means and capable of being raised above the milk-vat A, as seen in Figs. 2 and 4, and of being moved downward to the position shown in Figs. 3 and 5, so as to inclose said vat at the sides and top.

In use, milk is placed within the vat A and the reservoir C lowered until it nearly or quite rests upon the upper edge of the former, when, the interior of said reservoir being filled with water having the necessary temperature, the heat of the milk is abstracted from the sides and top until its temperature reaches the desired point. The temperature of the water within said reservoir may be regulated by means of ice, or a constant supply from a spring or other source may be caused to enter through the pipes $d^2$ and D and to escape through the overflow $c'$.

The method described of cooling the milk leaves the vat A free from all contact with water or connection with apparatus for containing the same, so that said vat is easily handled and cared for, as though no cooling means were employed.

In consequence of the application of the heat-abstracting medium to the top and sides only of the milk, a downward current of relatively-cool milk is caused around the entire vat at its walls, while an upward current of warmer milk is produced at the center, the result being the constant movement toward and speedy collection at the top of the milk of all cream contained therein. After the cream is ready for separation from the milk the latter is drawn from beneath the former through the opening $a'$, the glazed opening $a$ enabling the operator to observe the movement of said milk and to close said opening when no more remains.

Having thus fully set forth the nature and merits of my invention, what I claim as new is—

1. The combination, with a milk-vat, of a reservoir, C, having a recess, $c$, of corresponding horizontal shape to that of the vat, and a surrounding space to contain the cooling medium, and adapted to be suspended above said vat, so as to surround the same, out of contact therewith at its top and sides, whereby air is permitted to circulate freely around and over said vat, substantially as and for the purpose specified.

2. The combination, with a milk-vat, A, of a reservoir, C, corresponding in horizontal shape to the shape of the vat, and having at its lower portion a recess, $c$, to receive the vat, and a surrounding space to receive the cooling medium, and having water-supply pipes D $d^2$, perforated pipes $d$, and overflow $c'$, substantially as and for the purpose shown and described.

In testimony that I claim the foregoing I have hereunto set my hand this 28th day of March, 1881.

DANIEL BROWN.

Witnesses:
 DE WITT C. CRUMB,
 WHITFORD M. REYNOLDS.